(12) United States Patent
Knockl et al.

(10) Patent No.: US 7,503,306 B2
(45) Date of Patent: Mar. 17, 2009

(54) AIR GUIDE IN VEHICLE ENGINE BAY

(75) Inventors: Rainer Knockl, Sandersdorf (DE); Gerd Rathke, Marktoberdorf (DE)

(73) Assignee: AGCO GmbH (DE)

( * ) Notice: Subject to any disclaimer, the term of this patent is extended or adjusted under 35 U.S.C. 154(b) by 0 days.

(21) Appl. No.: 11/755,070

(22) Filed: May 30, 2007

(65) Prior Publication Data

US 2007/0289570 A1 Dec. 20, 2007

(30) Foreign Application Priority Data

Jun. 17, 2006 (GB) .............................. 0612039.8

(51) Int. Cl.
*F02M 35/00* (2006.01)
(52) U.S. Cl. .................. 123/198 E; 123/41.7; 180/68.1
(58) Field of Classification Search .............. 123/198 E, 123/41.7, 41.56, 41.58; 180/68.1, 68.2, 68.3
See application file for complete search history.

(56) References Cited

U.S. PATENT DOCUMENTS

| 5,036,931 | A | * | 8/1991 | Iritani ........................ 180/68.1 |
| 5,207,187 | A | | 5/1993 | Kurohara et al. |
| 5,678,648 | A | * | 10/1997 | Imanishi et al. ............ 180/68.1 |
| 5,689,953 | A | * | 11/1997 | Yamashita et al. ............ 60/316 |
| 5,782,312 | A | * | 7/1998 | Murakawa .................. 180/69.2 |
| 6,167,976 | B1 | * | 1/2001 | O'Neill et al. .............. 180/69.2 |
| 6,557,772 | B1 | * | 5/2003 | Pettigiani et al. ........ 237/12.3 B |

FOREIGN PATENT DOCUMENTS

EP 0873899 10/1998

OTHER PUBLICATIONS

European Search Report of related European Application No. 07011249 dated Sep. 12, 2007.

* cited by examiner

*Primary Examiner*—Michael Cuff
*Assistant Examiner*—Hyder Ali
(74) *Attorney, Agent, or Firm*—Ryan A. Schneider, Esq.; Troutman Sanders LLP

(57) ABSTRACT

An air guide is disclosed for a bonnet-covered engine bay of a goods vehicles, in particular agricultural tractors, where under the bonnet are located a combustion engine (1), components under high thermal load and low thermal load, and a fan which generates an air flow which is directed through air guide ducts past the combustion engine into the open. As the air flow from the fan heats up greatly on the combustion engine, there is a risk of a deterioration in the functioning of heat-sensitive components exposed to the air flow. To eliminate this risk, on both sides of the combustion engine (1) in the area of the components (4, 5, 6, 7) under high thermal load, between the combustion engine (1) and a side part (3) of the bonnet in a plane lying substantially parallel to the side part of the bonnet or combustion engine (1), is arranged an air guide element (11) which divides the air flow from the fan into an air flow (12) between the engine and the guide element (11) over the components (4, 5, 6, 7) under high thermal load and at least one air flow (13,14) between the guide element (11) and the side part (3) of the bonnet over the components (8, 9) under low thermal load.

6 Claims, 4 Drawing Sheets

AIR GUIDE IN VEHICLE ENGINE BAY

This application is based on, and claims the benefit of priority to, UK application GB 06120369.8, filed 17 Jun. 2006, which priority application is hereby incorporated by reference.

BACKGROUND OF THE INVENTION

1. Field of the Invention

The invention relates to an air guide in a bonnet-covered vehicle engine bay, in particular in an agricultural tractor, where under the bonnet are located a combustion engine, components under high thermal load and low thermal load, and a fan which generates an air flow which is directed through air guide ducts past the combustion engine into the open.

2. Description of Related Art

Goods vehicles such as agricultural tractors are driven by water-cooled combustion engines which are located in an engine bay, covered by a bonnet, in front of the driver's console or cab. To cool the combustion engine, a cooling system comprising a radiator and a fan is located in front of the engine. Constant high drive power from the combustion engine leads to an increase in fuel consumption. Since for physical reasons only around one-third of the energy contained in the fuel is converted into mechanical useful power, the remaining energy occurs as waste heat. This is dissipated through the radiator to the environment by the coolant water of the combustion engine by means of the air flow generated by the fan. The air flow thus assumes temperatures between 90° and 100°.

In relation to components under high thermal load close to the combustion engine such as the exhaust turbocharger, exhaust pipe, silencer and exhaust gas recycling radiator, which are exposed to hot exhaust gases and can assume temperatures of 500° to 700°, the air flow leaving the radiator is however relatively cool. It is therefore conventional and known, for example from DE 10 2004 028 593 A1, to cool the components under high thermal load by passing an air flow leaving the radiator over these components. The air flow here, however, reaches a temperature level which cannot be tolerated without damage by components under low thermal load. In this earlier specification it is proposed to reduce the heat load of the components located in the engine bay, by driving the engine bay by means of a heat-screening component into several areas lying above each other but thermally separated, where components under high thermal load are arranged on the one side and components under low thermal load are arranged on the other side of the heat-screening component. According to this earlier specification the components under low thermal load are exposed to an air flow which is not branched from the air flowing through the radiator but bypasses the radiator without the effect of the fan. In agricultural tractors which often develop their maximum power at very low drive speeds or even when standing still, it is practically impossible to provide a screen with such a bypass as the installation space below the radiator is occupied extremely densely with other vehicle components; furthermore in these vehicles components under low thermal load such as electronic components, sensors and the starter or parts of the bonnet made of non-heat-resistant material are frequently located on the rear part of the combustion engine. There they are in some cases not only in direct contact with the hot housing of the combustion engine but are also exposed to the air flow which has heated up substantially while passing the combustion engine and the components under high thermal load. This can heat components under low thermal load unacceptably.

The object of the invention is, therefore, to create an air guide for the air flow from the fan below the vehicle bonnet which ensures no deterioration in function of heat-sensitive components.

BRIEF SUMMARY OF THE INVENTION

This object is achieved in that on both sides of the combustion engine in the area of the components under high thermal load, between the combustion engine and the bonnet, in a plane lying substantially parallel to the bonnet or combustion engine is arranged an air guide element which divides the air flow from the fan into a flow guided on the engine side of the guide element over the components under high thermal load and at least one air flow guided on the bonnet side of the guide element over components under low thermal load.

Other measures refining the invention are given in the sub-claims.

As a result, by means of a technically simple plate construction in which the air guide element is a heat-resistant shielding panel, separate part air flows of defined air quantity and guidance can be formed which allow optimum cooling firstly of the combustion engine and components under high thermal load located close to the engine, and secondly of components under low thermal load with relatively cool air that has not passed over components with high thermal load, from the part flow from the fan. The air heated by the components under high thermal load is advantageously passed directly downwards to the open in the rear section of the engine bay so that it does not reach either the driver's cab or the bonnet. The expense for maintaining a pleasant temperature in the driver's cab is thus kept low. Also the relatively low temperature of the air flow leaving the fan allows production of the bonnet from a material with low thermal resistance, e.g. plastic, and omission of costly heat insulation for its protection.

BRIEF DESCRIPTION OF THE DRAWINGS

One embodiment of the invention is described by way of example only with reference to the accompanying drawings in which.

DETAILED DESCRIPTION OF PREFERRED EMBODIMENTS

Figure 1:
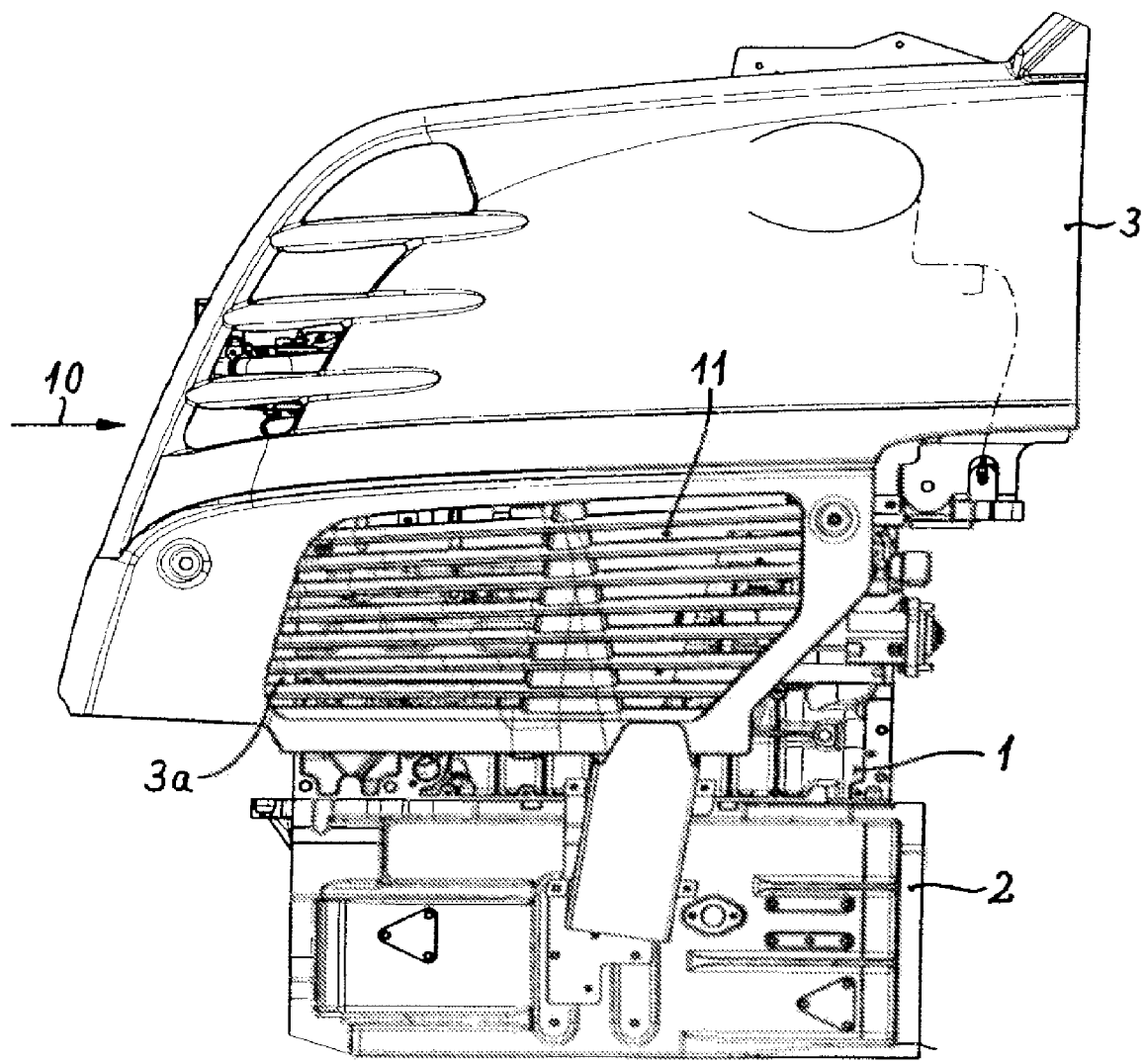
FIG. 1 shows the left-hand side in relation to the travel direction of a bonnet-covered engine bay of an agricultural tractor.

Although the air guide according to the invention shown in the figures is arranged on the left-hand side of the engine bay viewed in the direction of travel and described accordingly, the invention is implemented similarly also on the right-hand side of the bonnet.

The drawings show a combustion engine 1 having a crankcase 2. The combustion engine 1 is surrounded by a bonnet of which however in FIG. 1 only the left-hand side part 3 is shown. This is made from a plastics materials with low thermal resistance and at the level of the engine 1 has a number of horizontal slots 3a.

Inside the engine bay formed by the bonnet are located components under high thermal load such as the exhaust turbocharger 4, the supply pipe 5 to the silencer 6 and the exhaust gas recycler 7. Furthermore, also arranged there are components under low thermal load close to the engine, such as the starter 8 and an electronics box 9.

Figure 2:
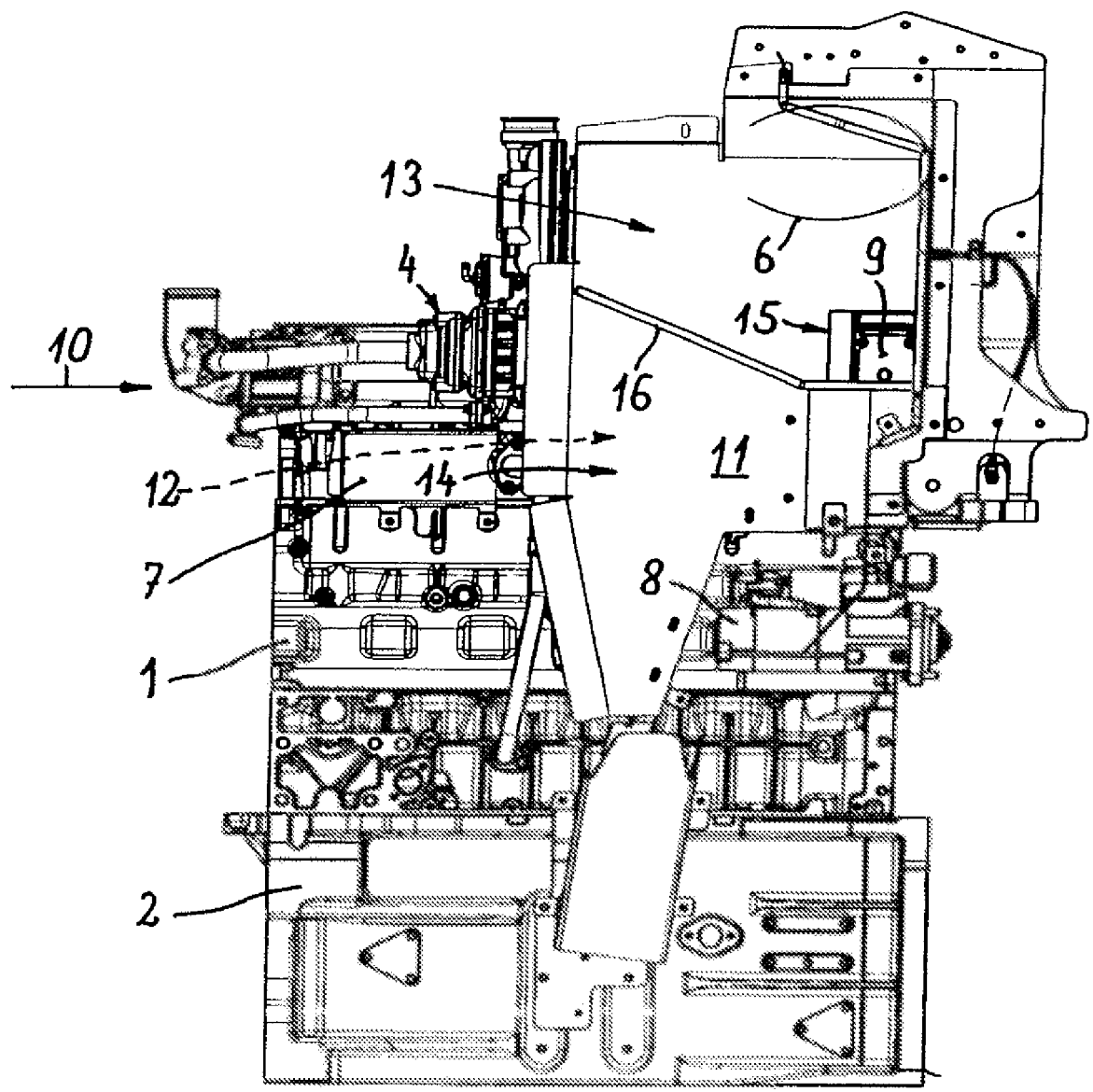
FIG. 2 shows a side view of the engine bay according to FIG. 1 without bonnet.
Figure 3:
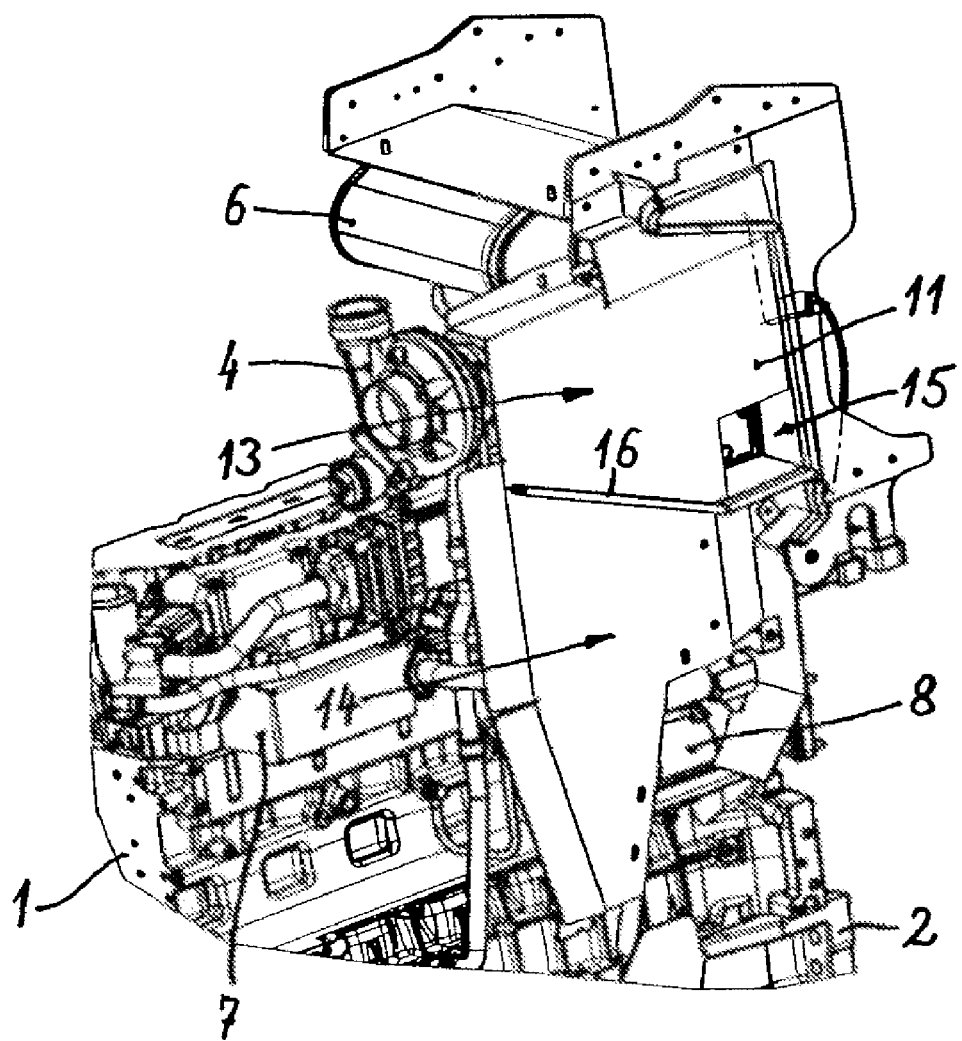
FIG. 3 is a perspective view of the engine bay according to FIG. 2.
Figure 4:
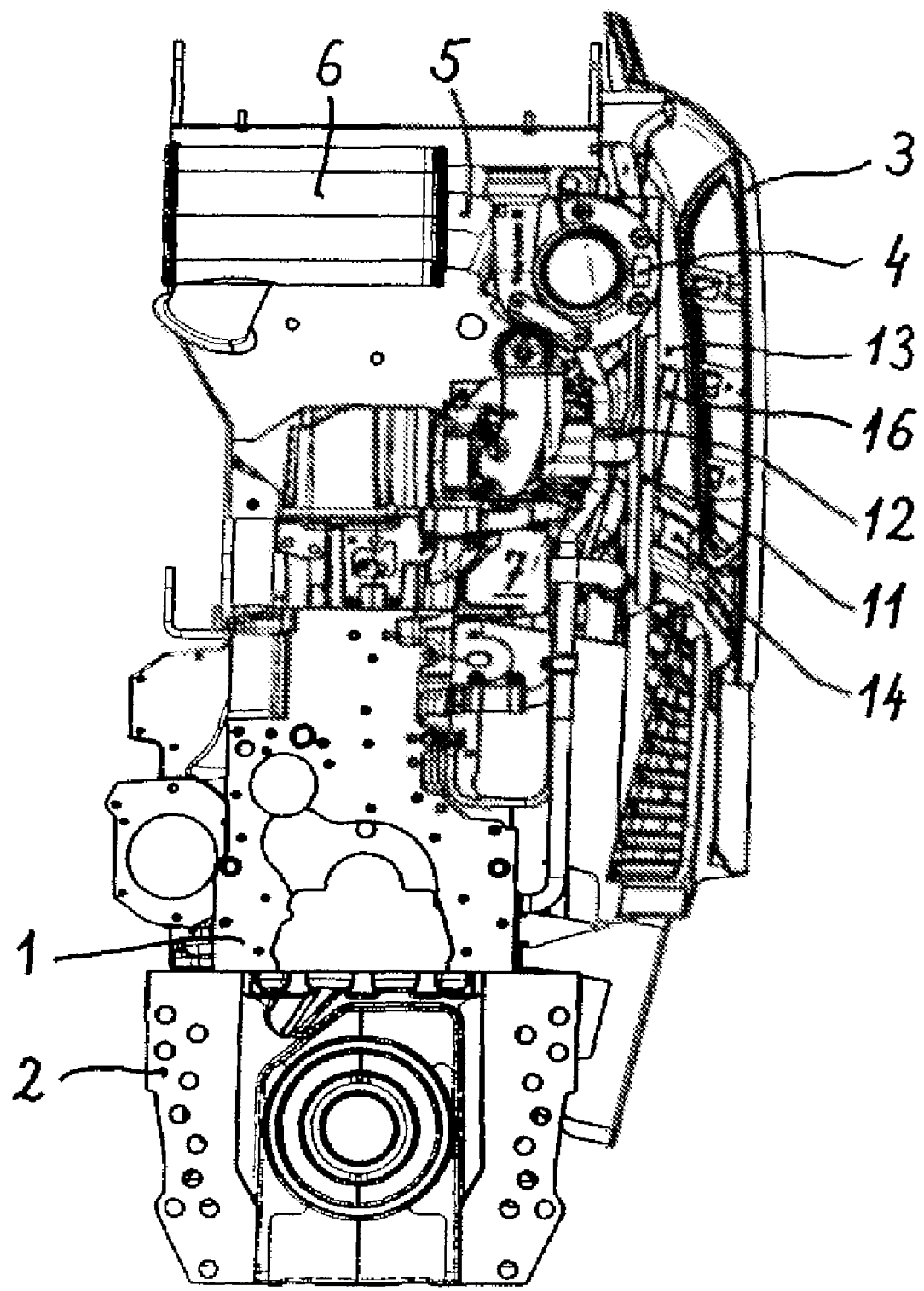
FIG. 4 is a view of the engine bay in the direction of the arrow 10 in FIG. 1.

A fan, not shown, that is arranged on the left in front of the engine 1 in FIGS. 1 and 2, generates an air flow directed in the direction of the arrow 10 which splits in front of the engine 1 into an air flow guided to the left and one guided to the right between the engine 1 and the side part 3 of the bonnet.

In order to make optimum use of the air flow on the left-hand side of the engine 1 to cool the components below the bonnet, between the engine 1 and the side part 3, a special air guide element 11 is provided. This guide is approximately parallel to the side part 3 of the bonnet and acts as a shield being made from a material with poor heat conductance but good heat resistance. This guide element allows the construction of several air guide ducts.

A first air guide duct 12 is formed close to the engine between the air guide element 11 and the engine 1 and guides the air flowing through it with cooling effect over the components 4, 5, 6, 7 under high thermal load and then, still greatly heated, downward into the open. A second 13 and a third 14 air guide duct remote from the engine are created between the air guide element 11 and the side part 3 of the bonnet. The second air guide duct 13 guides an air flow to a chamber 15, which houses the electronics box 9 or other electronic components under low thermal load, and then into the open. Since before entering the second air guide duct 13, this air flow has no opportunity to become heated from the components under high thermal load, and after entering the air guide duct 13 is insulated by the air guide element 11 from the components under high thermal load, the electronics box 9 and also the side part 3 are cooled effectively with relatively cold air.

The third air guide duct 14 guides an air flow, the temperature of which is relatively low like that of the air flowing through the second air guide duct 13, to the starter 8 where part of this air flow escapes through the slots 3a in the side part 3. The slots 3a are dimensioned here such that sufficient air is supplied to the starter 8 and the adjacent area of the side part 3 to cool both components sufficiently. As the two air guide ducts 13, 14 have very different pressure losses, they are separated from each other by a wall 16. This ensures that both the electronics box 9 and the starter 8 are exposed to an adequate air flow.

LEGEND

1 Combustion engine
2 Crankcase
3 Side part (of bonnet)
3a Slots
4 Exhaust turbocharger
5 Supply pipe to silencer
6 Silencer
7 Exhaust gas recycling
8 Starter
9 E-box
10 Arrow
11 Air guide element
12 Air guide duct on engine side
13 Air guide duct on bonnet side for E-box
14 Air guide duct on bonnet side for starter
15 Housing for E-box
16 Wall

We claim:

1. An air guide for a bonnet-covered engine bay of a goods vehicles, in particular agricultural tractors, where under the bonnet are located a combustion engine, components under high thermal load and low thermal load, and a fan which generates an air flow which is guided through air ducts past the combustion engine into the open, wherein on both sides of the combustion engine in the area of the components under high thermal load, between the combustion engine and a side part of the bonnet, in a plane lying substantially parallel to the side part of the bonnet or the combustion engine is arranged an air guide element which divides the air flow from the fan into an air flow between the engine and guide element over the components under high thermal load and at least one air flow between the guide element and the side part of the bonnet over components under low thermal load, wherein the air guide element forms two air guide ducts on the bonnet of the air guide element, a first air guide duct which supplies an air flow to a first component under low thermal load close to the engine and which opens downwards into the open in a rear section of the engine bay, and a second air guide duct which takes an air flow to cool a second component close to the engine and under low thermal load and which opens in the rear section of the engine bay into the open.

2. An air guide according to claim 1, wherein the air guide element is a heat-resistant shield panel.

3. An air guide according to claim 1, wherein the air flow close to the engine is directed downwards into the open in the rear section of the engine.

4. An air guide for a bonnet-covered engine bay of a goods vehicles, in particular agricultural tractors, where under the bonnet are located a combustion engine, components under high thermal load and low thermal load, and a fan which generates an air flow which is guided through air ducts past the combustion engine into the open, wherein on both sides of the combustion engine in the area of the components under high thermal load, between the combustion engine and a side part of the bonnet, in a plane lying substantially parallel to the side part of the bonnet or the combustion engine is arranged an air guide element which divides the air flow from the fan into an air flow between the engine and guide element over the components under high thermal load and at least one air flow between the guide element and the side part of the bonnet over components under low thermal load, wherein the air flow close to the engine is directed downwards into the open in the rear section of the engine.

5. An air guide according to claim 4, wherein the air guide element forms two air guide ducts on the bonnet of the air guide element, a first air guide duct which supplies an air flow to a first component under low thermal load close to the engine and which opens downwards into the open in a rear section of the engine bay, and a second air guide duct which takes an air flow to cool a second component close to the engine and under low thermal load and which opens in the rear section of the engine bay into the open.

6. An air guide according to claim 4, wherein the air guide element is a heat-resistant shield panel.

* * * * *